US006455644B1

(12) United States Patent
Olson et al.

(10) Patent No.: US 6,455,644 B1
(45) Date of Patent: Sep. 24, 2002

(54) POLYOLEFIN PRODUCTION USING CONDENSING MODE IN FLUIDIZED BEDS, WITH LIQUID PHASE ENRICHMENT AND BED INJECTION

(75) Inventors: Robert Darrell Olson; Timothy Joseph Howley, both of Charleston, WV (US)

(73) Assignee: Union Carbide Chemicals & Plastics Technology Corporation, Danbury, CT (US)

(*) Notice: Subject to any disclaimer, the term of this patent is extended or adjusted under 35 U.S.C. 154(b) by 0 days.

(21) Appl. No.: 09/514,440

(22) Filed: Feb. 28, 2000

(51) Int. Cl.[7] .................................................. C08F 2/00

(52) U.S. Cl. ............................ 526/67; 526/68; 526/70; 526/88; 526/901; 422/140

(58) Field of Search ............................ 526/67, 68, 70, 526/88, 901; 366/101, 150.1; 422/140

(56) References Cited

U.S. PATENT DOCUMENTS

| | | | | |
|---|---|---|---|---|
| 4,543,399 | A | 9/1985 | Jenkins et al. | 526/70 |
| 4,621,952 | A | 11/1986 | Aronson | 406/138 |
| 4,640,963 | A | 2/1987 | Kreider et al. | 526/67 |
| 5,197,509 | A | 3/1993 | Cheng | 137/13 |
| 5,352,749 | A | 10/1994 | DeChellis et al. | 526/68 |
| 5,541,270 | A | 7/1996 | Chinh et al. | 526/68 |
| 5,733,510 | A | 3/1998 | Chinh et al. | 422/143 |
| 5,804,677 | A | 9/1998 | Chinh et al. | 526/68 |
| 5,834,571 | A | 11/1998 | Bernier et al. | 526/68 |
| 2001/0024625 | A1 * | 9/2001 | Olsen et al. | 526/70 X |

FOREIGN PATENT DOCUMENTS

| | | |
|---|---|---|
| EP | 0824114 | 2/1998 |
| EP | 0824116 | 2/1998 |
| EP | 0824117 | 2/1998 |
| WO | WO9900430 | 1/1999 |

* cited by examiner

*Primary Examiner*—Fred Teskin

(57) ABSTRACT

The partially condensed fluid recycle stream of a fluidized bed polyolefin reactor operating in the condensing mode is split into two portions by a stream splitter. In a preferred mode, the smaller stream from the splitter contains a higher ratio of liquid to gas than the larger stream. One portion of the split stream is injected below the fluidized bed and the other, preferably with enhanced liquid content, is injected into the fluidized bed at a level above the distributor plate, preferably above the product withdrawal level.

15 Claims, 9 Drawing Sheets

POLYETHYLENE (PE) VAPOR PHASE VELOCITY MAGNITUDE PROFILES WITH 35 ft/sec INLET
ZOOMED VIEW ILLUSTRATING STAGNANT REGION AT PIPE BOTTOM

| ZONE | DROPLETS (104 MICRONS) |
|---|---|
| B | 38 |
| D | 11 |
| E | 12 |
| G | 20 |
| H | 56 |
| K (OUT) | 666 |
| L (OUT) | 197 |
| TOTAL | 1000 |

POLYETHYLENE (PE) VAPOR PHASE VELOCITY MAGNITUDE PROFILES WITH 35 ft/sec INLET WITH 104 Micron LIQUID DROPLET DISTRIBUTION DATA TYPICAL 8 DROPLET TRAJECTORY WITH 35 ft/sec INLET WITH LIQUID DROPLET DISTRIBUTION DATA

| ZONE | DROPLETS (312 MICRONS) |
|---|---|
| B | 68 |
| C | 2 |
| D | 14 |
| E | 9 |
| F | 7 |
| G | 63 |
| H | 170 |
| K ( OUT ) | 469 |
| L ( OUT ) | 198 |
| TOTAL | 1000 |

POLYETHYLENE (PE) VAPOR PHASE VELOCITY MAGNITUDE PROFILES WITH 55 ft/sec INLET WITH 312 Micron LIQUID DROPLET DISTRIBUTION DATA

| ZONE | DROPLETS (104 MICRONS) |
|---|---|
| B | 35 |
| C | 0 |
| D | 13 |
| E | 9 |
| E | 0 |
| G | 13 |
| H | 33 |
| K (OUT) | 717 |
| L (OUT) | 180 |
| TOTAL | 1000 |

POLYPROPYLENE (PP) VAPOR PHASE VELOCITY MAGNITUDE PROFILES WITH 25 ft/sec INLET WITH 104 Micron LIQUID DROPLET DISTRIBUTION DATA

| ZONE | DROPLETS (312 MICRONS) |
|---|---|
| B | 71 |
| C | 2 |
| D | 14 |
| E | 11 |
| F | 3 |
| G | 21 |
| H | 77 |
| K ( OUT ) | 610 |
| L ( OUT ) | 186 |
| TOTAL | 1000 |

POLYPROPYLENE (PP) VAPOR PHASE VELOCITY MAGNITUDE PROFILES WITH 35 ft/sec INLET WITH 312 Micron LIQUID DROPLET DISTRIBUTION DATA

POLYOLEFIN PRODUCTION USING CONDENSING MODE IN FLUIDIZED BEDS, WITH LIQUID PHASE ENRICHMENT AND BED INJECTION

TECHNICAL FIELD OF THE INVENTION

This invention relates to gas phase exothermic reactions to make particulate product in fluidized bed reactors. The invention is described with respect to olefin polymerization but is not limited to the production of polymeric products; rather, it may be practiced in connection with any exothermic reaction which is carried out in a gas fluidized bed with external cooling. It relates particularly to improvements in the condensing mode of operation in which a portion of the fluidizing gas or fluid is withdrawn from the reactor, cooled to remove the heat of reaction, partially condensed, and recycled back to the fluidized bed reactor. In the present invention, the recycle is effected by splitting the recycle stream in at least two streams directed to different areas of the reactor.

BACKGROUND OF THE INVENTION

The gas phase fluidized bed process for polymerization permits a reduction in energy requirements and capital investment compared with more conventional processes. However, a limiting factor is the rate at which heat can be removed from an exothermic reaction occurring within a fluidized bed. The heat of reaction is commonly removed from the fluidized bed by compression and cooling of a recycle stream external to the reactor vessel. The circulated recycle stream promotes fluidization of the bed within the reactor. The fluid velocity within the reactor is limited by the need to prevent excessive entrainment of solids in the fluidizing gas stream as it exits for recycle from the reactor. Hence the amount of fluid which can be circulated and cooled per unit of time to remove the exothermic heat of polymerization is limited. As polymer product is produced and removed from the fluidized bed, reactants and catalyst material are continuously supplied either to the recycle stream or directly to the reaction zone of the fluidized bed.

The quantity of polymer exothermically produced in a given volume of the fluidized bed is related to the ability to remove heat from the reaction zone. Adequate heat removal is critical to maintain a uniform temperature within the fluidized bed and also to avoid catalyst degradation and polymer agglomeration. The temperature in the reaction zone is controlled below the fusing temperature of the polymer particles. The dew point of the recycle stream is the temperature at which liquid condensate begins to form in the recycle stream. By cooling the recycle stream below the dew point temperature and then injecting the two phase mixture thus formed into the reaction zone, the heat of vaporization of liquid is available to consume a portion of the exothermic heat of polymerization. This process is known as "condensed mode" operation of a gas phase polymerization process. As disclosed by J. M. Jenkins et al. in U.S. Pat. Nos. 4,543,399 and 4,588,790 and by M. L. DeChellis, et al. in U.S. Pat. No. 5,352,749, operation in "condensed mode" permits an increase in the space time yield of the reaction system—that is, an increase in the amount of polymer produced per unit of time in a given fluidized bed reactor volume.

Below the reaction zone of the fluidized bed is a gas distributor grid plate. Its function is to provide a uniform distribution of the recycle stream into the bottom of the bed. Below the gas distributor grid plate is located a bottom head mixing chamber where the recycle stream is returned after being compressed and cooled. As disclosed by S. J. Rhee, et al., in U.S. Pat. No. 4,933149, flow deflection devices can be designed and positioned within the bottom head mixing chamber, to avoid excessive build up of entrained solids within the bottom head mixing chamber when operating without partial condensation of the recycle stream. When operating in "condensed mode", a deflector geometry as disclosed in the '149 patent may be used to avoid excessive liquid flooding or frothing in the bottom head mixing chamber. However, as the condensing level is increased to further enhance heat removal and space time yield, excessive amounts of liquid can exist in the bottom head mixing chamber. This can lead to liquid pooling and instability problems.

As disclosed by Jenkins, et al., in U.S. Pat. No. 4,543,399 and by Aronson in U.S. Pat. No. 4,621,952 the polymer product is intermittently withdrawn from the fluidized bed at an elevation above the gas distributor grid plate. At increasing levels of partial condensation of the recycle stream the likelihood increases that undesirably high levels of liquid phase may exist in lower portions of the fluidized bed. Unfortunately during a product discharge event liquid can be carried out of the reactor along with the granular polymer and gases. As the liquid expands and vaporizes within the discharge equipment, temperature reduction and pressure elevation can occur. This can reduce the fill efficiency of the discharge system. This reduction in fill efficiency reduces the production capacity of the facility and increases the raw material usage of the process. Accordingly, it has been difficult to increase the liquid content in the recycle stream to enhance the efficiency of removing the heat of reaction.

Chinh et al, in U.S. Pat. No. 5,804,677 describe the separation of liquid from a recycle stream; the separated, collected liquid is injected into the fluidized bed above the gas distributor plate. The present invention also injects recycle liquid above the distribution plate, but applicants' liquid is handled as a liquid/gas mixture and as a more or less predetermined fraction of the recycle stream, as a slip stream, divided simply and directly in the recycle conduit. Because of the applicants'0 manner of separating, we are able to enhance the ratio of liquid to gas in the slip stream as compared to the withdrawn recycle stream, and thus simply and directly, without additional or special equipment, improve heat exchange efficiency and enhance the space/time yield of the process.

SUMMARY OF THE INVENTION

Our invention comprises splitting the recycle stream, after compression and cooling, into at least two streams. One of the streams is returned to the distributor grid plate or similar device below or near the bottom of the bed and the other(s) are returned to the fluidized bed at one or more points above the distribution grid plate. The stream is split by a conduit segment designed for the purpose, sometimes herein called a splitter.

Preferably, the recycle stream is divided into two streams, the smaller of which is 5 to 30 percent of the total recycle stream and contains an enrichment of the liquid portion as a function of the relative momentums of the liquid and gas components of the recycle stream, impacting in the splitter, the liquid droplet size, and the particular configuration of the splitter. The liquid content (percentage by weight) of the smaller stream is preferably enriched to a percentage 1.01 to 3.0 times, more preferably 1.1 to 2.5 times that in the stream prior to separation. The larger of the separated streams, having a lower liquid concentration but a higher volume, is recycled to the bottom head mixing chamber of the reactor vessel and introduced into the reaction zone in a uniform fashion more or less conventionally through a gas distributor grid plate. The smaller stream or streams having an enriched liquid phase, is (or are) recycled into the reaction zone at an elevation above the gas distributor plate. Because of the lower ratio of liquid to gas in the larger stream as compared to the original cooled/condensed stream, only a minimal disturbance of the fluidized bed is imparted. We are thus able to inject higher quantities of recycled liquid into the bed without causing difficulties in the product withdrawal system.

An attractive novel feature of our modified recycle technique is that the separation of the recycle stream may be conducted without using mechanical equipment such as separators, hydrocyclones, demisters, scrubbers, entrainment collection devices, pumps, compressors or atomizers. Rather, by withdrawing the small two phase stream or streams from the recycle piping line, by the use of an elbow, bend, tee, or other piping configuration, an enrichment occurs of the liquid content in the small stream. This occurs without any moving parts or the application of energy. This enrichment is due to the difference in momentum between the lower density vapor phase and the higher density liquid phase. As a result of inertia, the liquid droplet trajectories deviate from the streamline of the bulk vapor flow. The liquid phase may exist in the form of droplets ranging in size from 50 to 2000 microns. By selection of a suitable piping system, the small stream or streams, which have been enriched in liquid content, may be re-injected into the reaction zone of the fluidized bed at a location above the gas distributor grid plate, preferably above the product withdrawal level. In this manner a large quantity of the condensed liquid exiting the cooler can be injected into the upper portions of the fluidized bed without separating the gas and liquid phases using mechanical equipment. This is an advantage over the methods disclosed by Chinh, et al. in U.S. Pat. Nos. 5,541,270, 5,668,228, 5,733,510 and 5,804,677 (see the summary above) in that the financial costs for mechanical equipment such as separators, hydrocyclones, demisters, scrubbers, entrainment collection devices, pumps, compressors or atomizers are not incurred. Some of these have moving parts and all entail substantial maintenance problems. The advantage compared to conventional technology incorporated by Union Carbide Corporation and disclosed by Jenkins, et al. in the U.S. Pat. Nos. 4,543,399 and 4,588,790 is that the liquid re-injection into the reaction zone of the fluidized bed can occur at one or more points above the gas distributor grid plate without substantial disturbance of the fluidized bed.

We use the term "splitter" to mean an elbow, bend, tee, or other conduit segment. having an inlet (upstream) portion and two or more outlet (downstream) portions. The outlet portions may be configured, either by a reduction in overall internal diameter or by one or more obstructions or diversions, to provide a resistance to the flow of fluid, which will, to at least some degree, cause liquid to coalesce or accumulate in at least one of the exit portions. Preferably, the incoming fluid is divided into a primary stream containing a high ratio of gas to liquid compared to the secondary stream(s) and at least one secondary or slip stream containing a relatively high ratio of liquid to gas compared to the fluid entering the splitter. The secondary stream may be larger—that is, the pipe diameter for the secondary stream may be greater than that of the primary stream, and/or the flow of total fluid may be greater in the secondary stream, but we prefer that the secondary stream—the stream containing a higher ratio of liquid to gas—be of a smaller diameter than the primary stream. We use the terms "secondary stream," "bypass," and "slip stream" interchangeably. There may be more than one secondary or slip stream. Further, the primary stream may be directed to another splitter to be further split into additional streams, at least one having an enhanced ratio of liquid to gas compared to the fluid entering it, for additional injection into elevated regions of the reactor, preferably above the product withdrawal level. However, fluidization of the bed 2 must be maintained throughout; fluidization requires a sufficient quantity and velocity of fluid through line 3 to distribution plate 7.

We use the term "through a direct passage" to mean that the slip stream is passed directly from the elbow, bend, tee, or other conduit segment (splitter) to the reaction zone of the reactor, or to the upstream end of another splitter, without going through any mechanical equipment such as separators, hydrocyclones, demisters, scrubbers, entrainment collection devices, pumps, compressors or atomizers.

The ability to pass the slip stream through a direct passage into the reaction zone of the fluidized bed is enhanced by the usual slight reduction in pressure in the fluidized bed from its lower region to its upper region. Commonly, the pressure in the upper regions is from 0.04 to 0.15 psi per foot of height less than that in the lower regions of the bed. Thus, the higher the injection point in the bed, the greater will be the difference between the pressure in the slip stream and that in the reactor bed, which of course assists the flow of the secondary stream into the fluidized bed. Generally, we will inject the secondary stream at one or more points between six inches and 10 feet above the distributor plate of a commercial polyolefin reactor such as that shown in FIG. 1, but we prefer to inject the secondary stream at a height between eighteen (18) inches and ninety-six (96) inches above the distributor plate. Recycle injection is preferably above the point of product withdrawal.

Our invention includes a conduit segment which will provide a slip stream through a direct passage from a preferred elbow configuration defining a settling chamber and a discharge duct for the slip stream located at the bend of the elbow. More particularly, our invention includes a splitter for splitting a partially condensed recycle stream from a recycle stream in a fluidized bed polyolefin reactor, the splitter comprising an inlet portion, a primary outlet portion communicating with the curved portion, a secondary outlet portion, the secondary outlet portion preferably including a settling chamber located downstream from, adjacent to, and on the outside radius of said curved portion, and a slip stream conduit communicating with the settling chamber, the slip stream conduit preferably having a smaller effective diameter than that of the primary outlet portion and of the settling chamber.

This invention is an improvement in the "condensed mode" of operation. As disclosed by Jenkins, et al. in U.S. Pat. Nos. 4,543,399 and 4,588,790 and by DeChellis, et al. in U.S. Pat. No. 5,352,749, operation in "condensed mode" permits an increase in the space time yield of the reaction system—that is, the amount of polymer produced per unit of time in a given fluidized bed reactor volume. Also disclosed by DeChellis in the aforementioned U.S. Patent is that excessively high levels of liquid introduced to the fluidized bed may promote the formation of undesirable polymer agglomerates, the presence of which can lead to bed collapse and reactor shutdown. Excessive liquids can also influence local bed temperatures which yield undesirable inconsistencies in polymer product properties.

Our invention provides an increase in the space time yield (polymer production per unit of time) of a reaction system of a given volume, compared to other condensed mode techniques. In particular, the separation of the partially condensed recycle stream is accomplished without the use of costly mechanical separating devices such as separators, hydrocyclones, demisters, scrubbers, entrainment collection devices, pumps, compressors or atomizers.

DETAILED DESCRIPTION OF THE INVENTION

Figure 1:
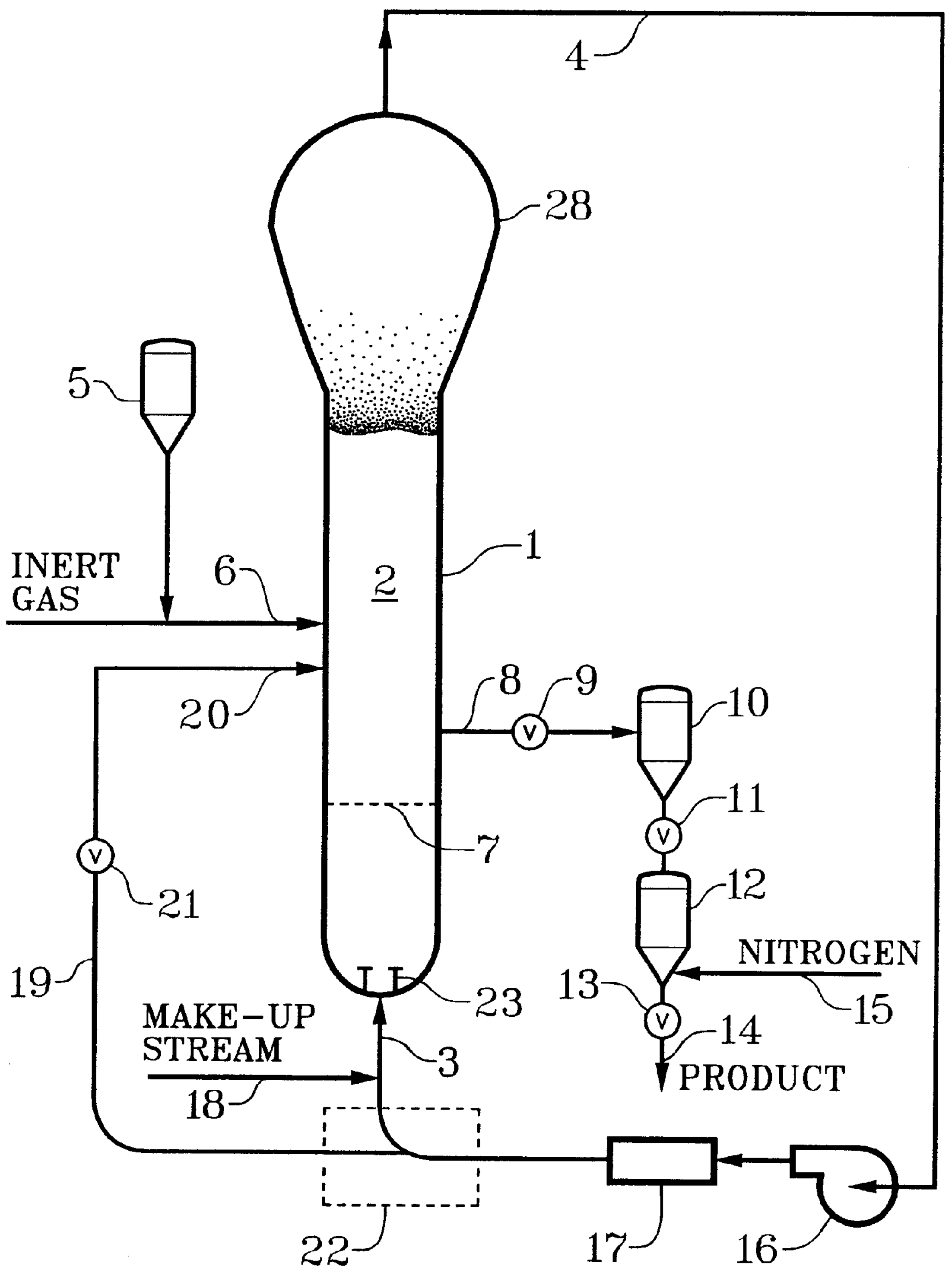
FIG. 1 is a schematic illustration of the gas phase fluidized bed exothermic polymerization process, including the recycle stream separation and liquid enrichment system.

Referring to FIG. 1 of the drawings, a preferred embodiment of the system for carrying out the process of the invention is shown. The reaction vessel 1 contains a fluidized bed 2 of particulate product with a fluid recycle stream entering the bottom inlet line 3 and exiting through line 4 from expanded section 28. Reaction catalyst is supplied intermittently or continuously from a reservoir 5 to a point 6 above the gas distributor grid plate 7 immediately below the fluidized bed 2. Polymer product is withdrawn intermittently or continuously through the discharge line 8 through valve 9 into tank 10. The discharge tank 10 may be connected by valve 11 in series with another tank 12. The polymer product is subsequently transferred to downstream processing equipment through valve 13 and line 14 with the optional addition of transfer assist gas through line 15. There are other ways known in the art to accomplish this product removal process and some are disclosed by Aronson in U.S. Pat. No. 4,621,952. The invention is not limited to the production of polymer products, but rather may be practiced in connection with any exothermic reaction which is carried out in a gas fluidized bed with external cooling. Variations are well known in the art for maintaining the bed in a fluidized state, feeding the catalyst, feeding the monomer(s), and recovering unreacted monomer from the product stream. Our invention can readily accommodate such variations as applied by persons skilled in the art.

The recycle stream exiting through line 4 of our preferred system is passed through a compressor 16 and cooler 17. As the reaction proceeds raw materials such as monomers are introduced possibly to the recycle stream 3 through line 18 or at other locations of the process such as directly into the fluidized bed 2 or into the recycle line 4. The maximum velocity of the recycle stream exiting through line 4 is constrained to avoid excessive entrainment of polymer particles into the recycle line. This is because the particles may tend to plug and foul compressor 16, cooler 17 and gas distributor grid plate 7. The function of the gas distributor grid plate is to provide a uniform distribution of the recycle stream into the bottom of the bed. The reaction vessel 1 normally includes an expanded upper section 28 to permit a local decrease in the gas velocity and reduce the propensity for the removal of polymer particles from the reactor through the top line 4. The minimum velocity of the recycle stream in line 4 is normally several times the minimum needed to suspend the particles within the bed 2 in a fluidized state.

The cooler 17 removes the exothermic heat of polymerization and the heat of compression. Adequate heat removal is important to maintain a uniform temperature within the fluidized bed and also to avoid catalyst degradation and polymer agglomeration. The temperature in the reaction zone is controlled below the fusing temperature of the polymer particles. Under steady state conditions, the temperature of the bed is nearly uniform. A temperature gradient exists within a small section of the bottom layer of the bed. Typically (and particularly in the absence of liquid introduction to the higher regions of the bed, as in the present invention) the temperature gradient does not extend above the first 12 inches of the bottom of the bed 2. The temperature gradient is caused by the lower temperature of the recycle stream which is returned to the bottom of the fluidized bed 2. As disclosed by Jenkins et al. in U.S. Pat. Nos. 4,543,399 and 4,588,790, the discharge temperature of the recycle stream exiting the cooler 17 may be below the dew point temperature of the mixture. The dew point is the temperature at which the mixture begins to condense. The recycle stream thus. may be partially condensed as it exits the cooler 17. This is known as "condensed mode" of operation. The amount of gas and non-condensed vapor in the recycle stream and the velocity of that non-liquid phase should be sufficient to keep the liquid portion of the recycle stream suspended, in order to avoid settling and accumulation of liquid in the recycle line 4. As disclosed by Rhee et al. in U.S. Pat. No. 4,933,149, a deflector device 23 can be designed and positioned in the bottom of the reactor 1 to permit stable operation with or without partial condensing of the recycle stream in line 4.

In accordance with this invention the partially condensed recycle stream which exits the cooler 17 is separated into two or more streams. The separation is conducted in a segment 22 of the recycle conduit including an elbow, bend, tee or any other splitter which will separate at least one slip stream, with or without achieving liquid enrichment in the slip stream line 19. By varying the design and placement of the conduit segment 22, the "slip stream" line 19 (sometimes herein called a bypass or a bypass line) can be enriched in liquid content relative to the primary exit stream. In particular line 19 preferably contains 5 to 30 percent of the material in the total recycle stream. By causing the separation to occur at an elbow, bend, tee or other splitter, an enrichment occurs of the liquid content in the small or slip stream (bypass) in line 19. This is due to the difference in momentum between the lower density vapor phase and the higher density liquid phase as they strike the outside radius of the splitter (conduit segment 22), to be explained further with respect to FIG. 2. The stream in line 19, which has preferably been enriched in liquid content, may be re-injected into the reaction zone of the fluidized bed at one or more locations 20 above the gas distributor grid plate 7. In this manner a large quantity of the condensed liquid exiting the cooler can be injected directly into the fluidized bed at levels above the distributor plate without separating the gas and liquid phases using mechanical equipment. The re-injection point of the stream in line 19 may be at multiple locations around the circumference of the fluidized bed and at multiple locations along the axis of the fluidized bed. The locations are chosen to insure rapid dispersion and vaporization of the relatively cool liquid contained in the two-phase stream in line 19. Flow in line 19 may be further controlled by valve 21. In particular, a preferred practice is to manipulate valve 21 to maintain a desired pressure differential of up to 10 psi, preferably 0.01 to 3 psi, between inlet location 20 and the point of entry into the reactor of line 3, the point lower in the bed having the higher pressure. Line 3 may extend into the reactor. In a typical large commercial fluidized bed polyolefin reactor, having a straight section of perhaps 50 feet in height, the lowest re-injection point will be at least 12 inches above the gas distribution plate 7. Re-injection should be in a zone of the fluidized bed where it will vaporize quickly, and usually this is in the lower half, preferably the lower third, of the bed. In addition, it is preferably injected above the product discharge level illustrated by product discharge line 8. However, in principle, the recycle fluid may be re-injected anywhere in the fluidized bed. We prefer that it be at one or more points in the lower third of the bed, for example 8-10 feet above the gas distribution plate.

The relative liquid enrichment of the usually smaller two-phase stream in line 19 can be affected by the velocity of the bulk stream exiting the cooler 17 and also by the density difference between the vapor and liquid phases. The velocity is determined partly by the physical dimensions of the recycle line and the design and operating characteristics of the compressor 16. As disclosed by Jenkins, et al. (see claims 21 and 22) in U.S. Pat. No. 4,588,790, the addition of inert components can be used to adjust the dew point of the recycle stream mixture. With respect to this invention, as the difference between the density of the condensed liquid phase and the density of the vapor phase is increased, the enrichment of liquid in the preferably small secondary recycle stream in line 19 is increased. The densities of the liquid and vapor phases change as the composition of the recycle stream is changed. The densities may be manipulated by the addition or removal of more volatile or less volatile (i.e. more dense and/or less dense) chemical components to the recycle stream or reactor. Thus the inerts added to promote condensation may be selected also to enhance the enrichment of liquid into the secondary recycle stream in line 19 by assuring a significant difference in densities. Also variations in the operating conditions within the reactor 1, depending upon the catalyst type being supplied through line 6, and the raw materials being supplied through line 18, will alter the density difference between the vapor and liquid phases exiting the cooler 17. The specific operating conditions are generally chosen and controlled to be nearly constant and uniform values to produce a consistent desired product which exits the system from line 14.

Figure 2:
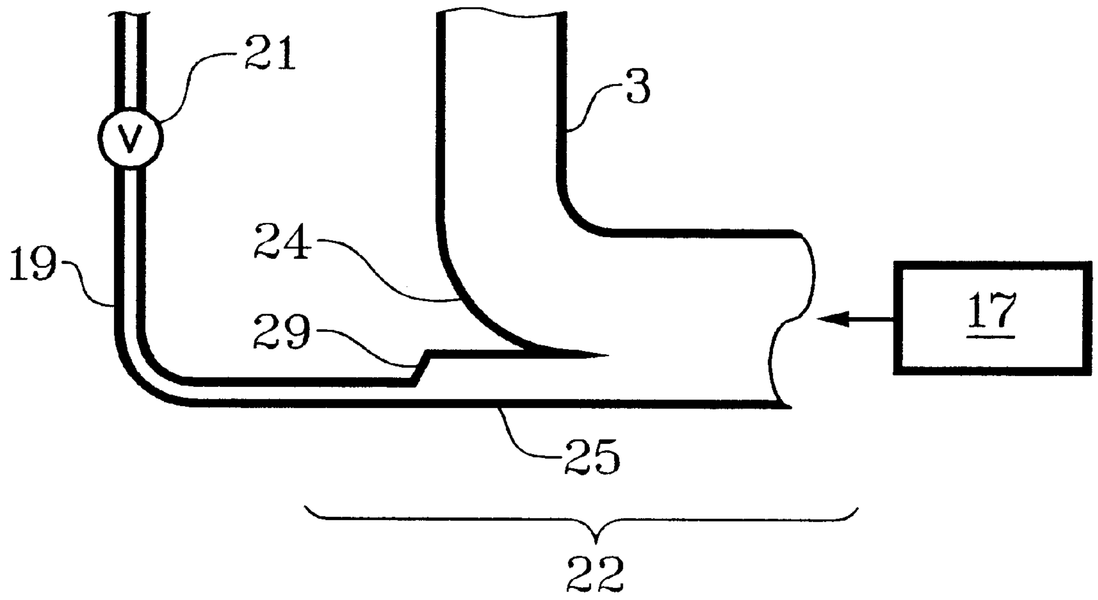
FIG. 2 depicts an elbow installed at the desired separation point for the recycle stream to provide a slip stream for insertion to the reaction zone of a fluidized bed such as in FIG. 1.

A preferred elbow-type splitter (conduit segment 22) is illustrated further in FIG. 2. FIG. 2 is an enlargement of the conduit segment 22 of FIG. 1, and shows a preferred configuration wherein partially condensed recycle fluid enters from cooler 17 and is split into two streams, a primary stream which enters line 3 and a secondary stream which proceeds through line 19. Line 19 is connected to the outside curve 24 of conduit segment 22, downstream of a settling chamber 25. The particular dimensions and curvatures of the conduit segment 22 which affect its efficiency as a fluid splitter may vary with product properties and process parameters as well as desired recycle rates. Generally, the secondary exit line 19 will preferably have a diameter from 5% to 20% of that of primary exit line 3, and settling chamber 25 will have a diameter larger than that of line 19, from to 10% to 30% of primary exit line 3. The illustrated settling chamber 25 has a downstream wall 29 to provide an obstacle to the free passage of liquid into line 19.

Figure 3:
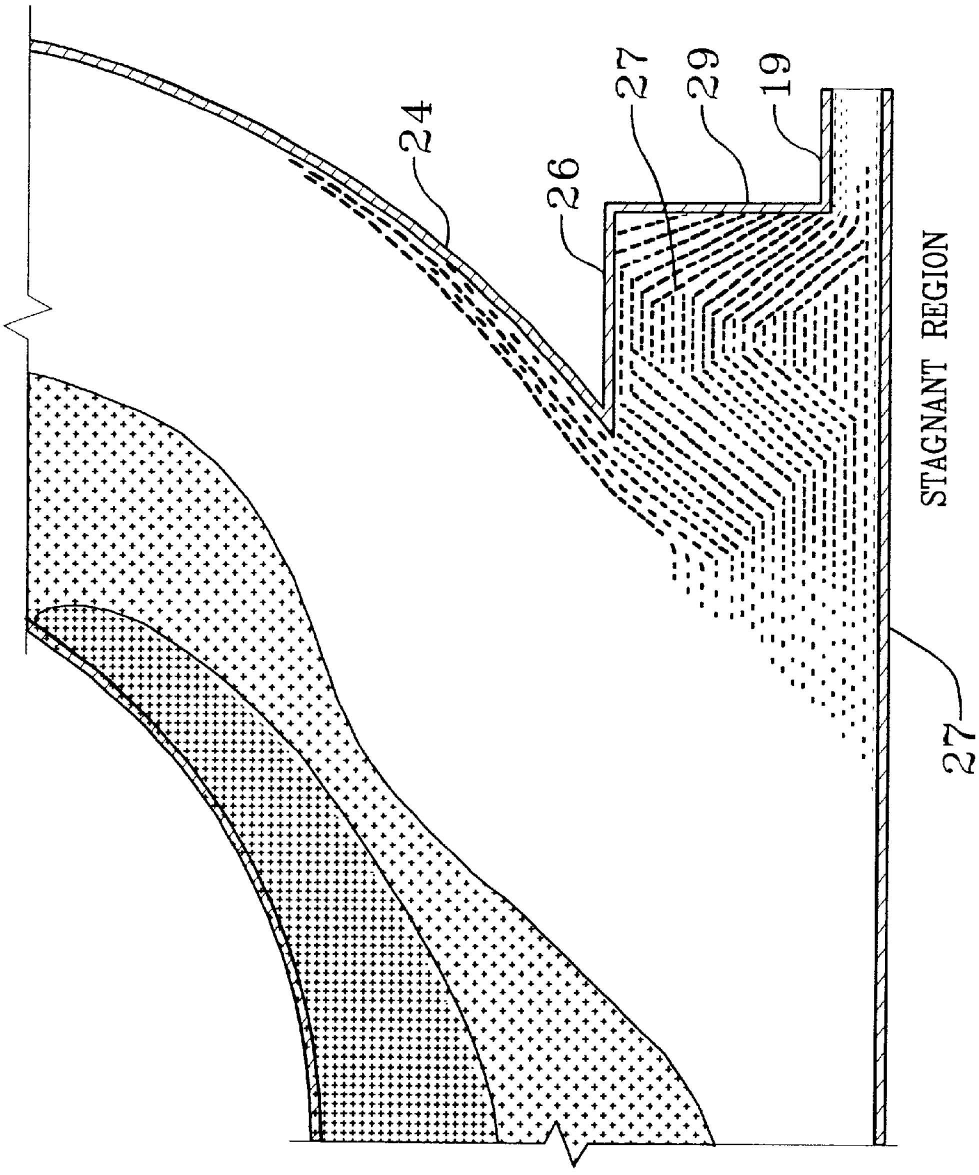
FIG. 3 is a further illustration of a preferred splitter to emphasize its optional settling zone.

A variant of settling chamber 25 is shown in FIG. 3, which is further enlarged and contains a computer-generated illustration of the accumulation of liquid in stagnant region 27 of settling chamber 26. In this version, downstream wall 29 is substantially vertical as depicted—that is, in a plane transverse to the flow in line 4 (FIG. 1) coming from cooler 17—as contrasted with the version illustrated in FIG. 2. Stagnant region 27 is shown with dotted lines; it represents the region in which liquid accumulates for transport into line 19 and beyond to the fluidized bed as described with respect to FIG. 1.

Figure 4:
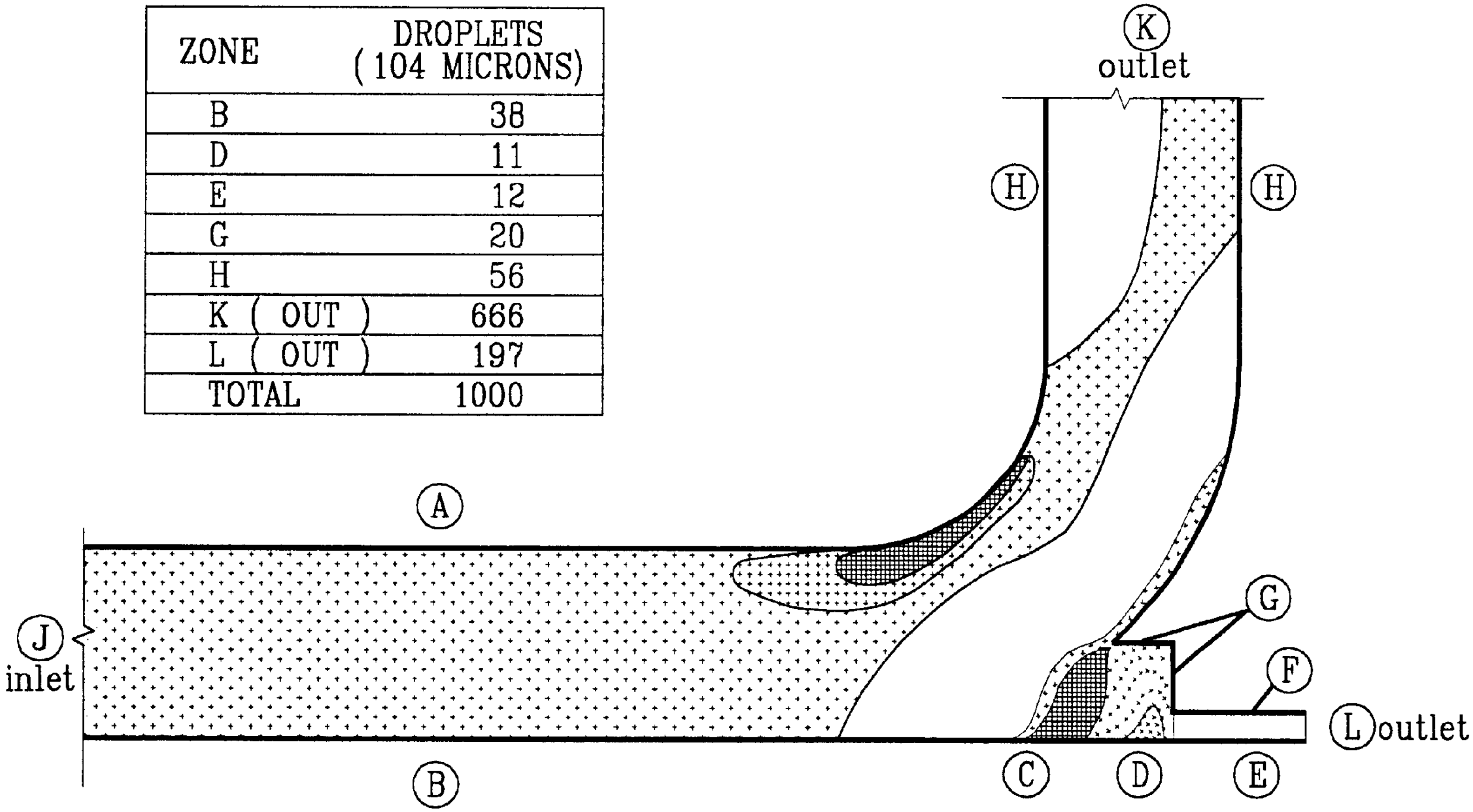
FIGS. 4, 6, 7, and 8 are velocity profiles with accompanying droplet distribution data within the preferred elbow configuration, as predicted by a computer simulation for various conditions and products.

The computer analysis depicted graphically in FIGS. 3 and 4 reveals that the liquid content of the collection stream is enriched. Results are presented below in TABLE 4. Liquid collection efficiencies of 24.00 to 28.82% were obtained for PE (polyethylene) operation, with a feed mixture containing 7.65 wt % liquid. A similar analysis was done for PP (polypropylene) operation with a feed mixture containing 15.6 and 24.9 wt % condensed liquid. The collection efficiency of the liquid droplets into the bypass stream is relative to the total amount of liquid which exits the cooler 17. A vapor rate through the bypass stream is also computed. An enrichment of liquid into the bypass stream occurs when the weight percentage of liquid in the bypass stream exceeds that in the mixture exiting the cooler 17. In the following tables, the “bypass stream enrichment ratio” therefore represents the amount of liquid in the slip stream (bypass stream) compared to the amount leaving the cooler 17. PP liquid collection efficiencies of 20.30 to 24.20% were obtained. These are shown in Table 5. The collection efficiency is strongly correlated with droplet size. As shown in Tables 4 and 5, splitters can be designed to achieve liquid enrichments in the bypass streams in excess of 1.1 times the liquid content of the stream entering the splitter.

Model and Geometry Assumptions

The FLUENT software program (Fluent, Inc., Lebanon, N.H.) computed vapor and liquid flow distribution within the piping and elbow region. The SIMPLE (semi-implicit method for pressure-linked equations) algorithm was employed along with the automatic grid generation features of the Unstructured Mesh Version of FLUENT.

A steady state model considered conservation of mass and momentum. It employed a standard k-e turbulence model with 5% inlet intensity. This lower level of turbulence was used since the flow profile in the Cycle Gas piping upstream of the elbow may be assumed to be well defined and relatively uniform.

Figure 9:
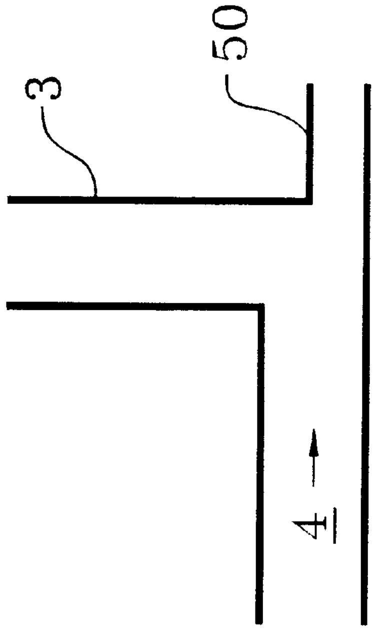
FIGS. 9, 10, 11 and 11*a* show variations in elbows which may be used in our invention.
Figure 10:
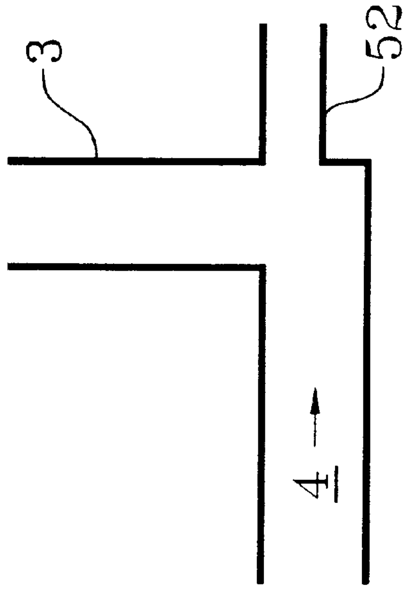
Figure 11:
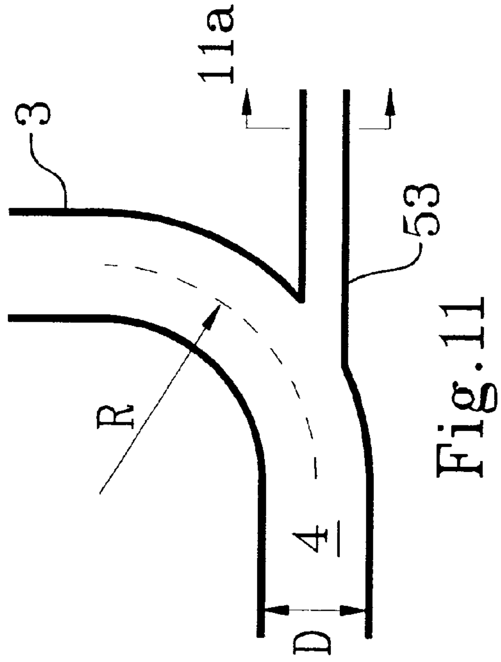
Figure 11A:
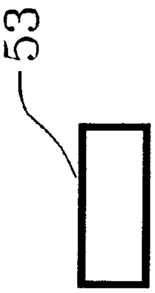

Table 1 includes results for a 3-dimensional geometry. An abrupt 90° elbow is illustrated in FIGS. 9 and 10. An ASME class B16.9 90° elbow with a rectangular bypass duct is represented in FIGS. 11 and 11*a*. In FIGS. 9, 10, and 11, the inlet diameter is 40.25 and the diameter of exit line 3 is also 40.25. In FIG. 11, note that the center of rectangular bypass line 53 is at the same level as the center of inlet 4.

TABLE 1

CYCLE PIPING AND BYPASS SLIP STREAM COLLECTION DEVICE GEOMETRY

| Device Description | Bypass Device Dimensions (inches) | Inlet Cycle Pipe Cylindrical Diameter (inches) | Reference FIGS. |
|---|---|---|---|
| 2-dimensional Elbow with Settling Chamber with Collection Nozzle | Chamber 18.00 Nozzle 4.00 | 34.50 | 3, 4, 5, 6,b 7, 8 |
| 3-dimensional Abrupt Elbow with Collection Nozzle | Nozzle 12.00 | 40.25 | 9, 10 |
| 3-dimensional ASME B16.9 Cylindrical Pipe and Elbow with Rectangular Collection Duct | Duct Width 18.0 Duct Height 9.0 | 40.25 | 11 |

Discrete Liquid Phase Droplet Model

Liquid droplet particle tracking was done using the Lagrangian discrete phase approach. The Lagrangian particle tracking feature allows for the computation of the trajectories of groups of individual droplets. This feature accounts for droplet inertia, drag, buoyancy and gravity forces. The drops were injected across the inlet boundary at evenly spaced injection points.

As shown in FIG. 4, defining zones along the wall and at exit boundaries allowed the monitoring of position for the droplets which were captured. All of the wall zones A, B, C, D, E, F, G, and H were assigned the property to capture any liquid droplets whose trajectory terminated there. Droplets in zones C, D, E, F, G, and L would be collected. The liquid collection efficiency was defined by dividing the droplet quantity in these zones by the total injected. Droplets in contact with zone B, the bottom of the Cycle Gas pipe, could possibly be re-entrained into the mixture.

Graphical fluid phase profiles were used to qualitatively assess liquid collection efficiency. A mean droplet size of 104 microns (0.0041 inch) and a maximum droplet size of 312 microns (0.0123 inch) were used. FLUENT post-processing using particle tracking was conducted using both the droplet sizes.

Figure 5:
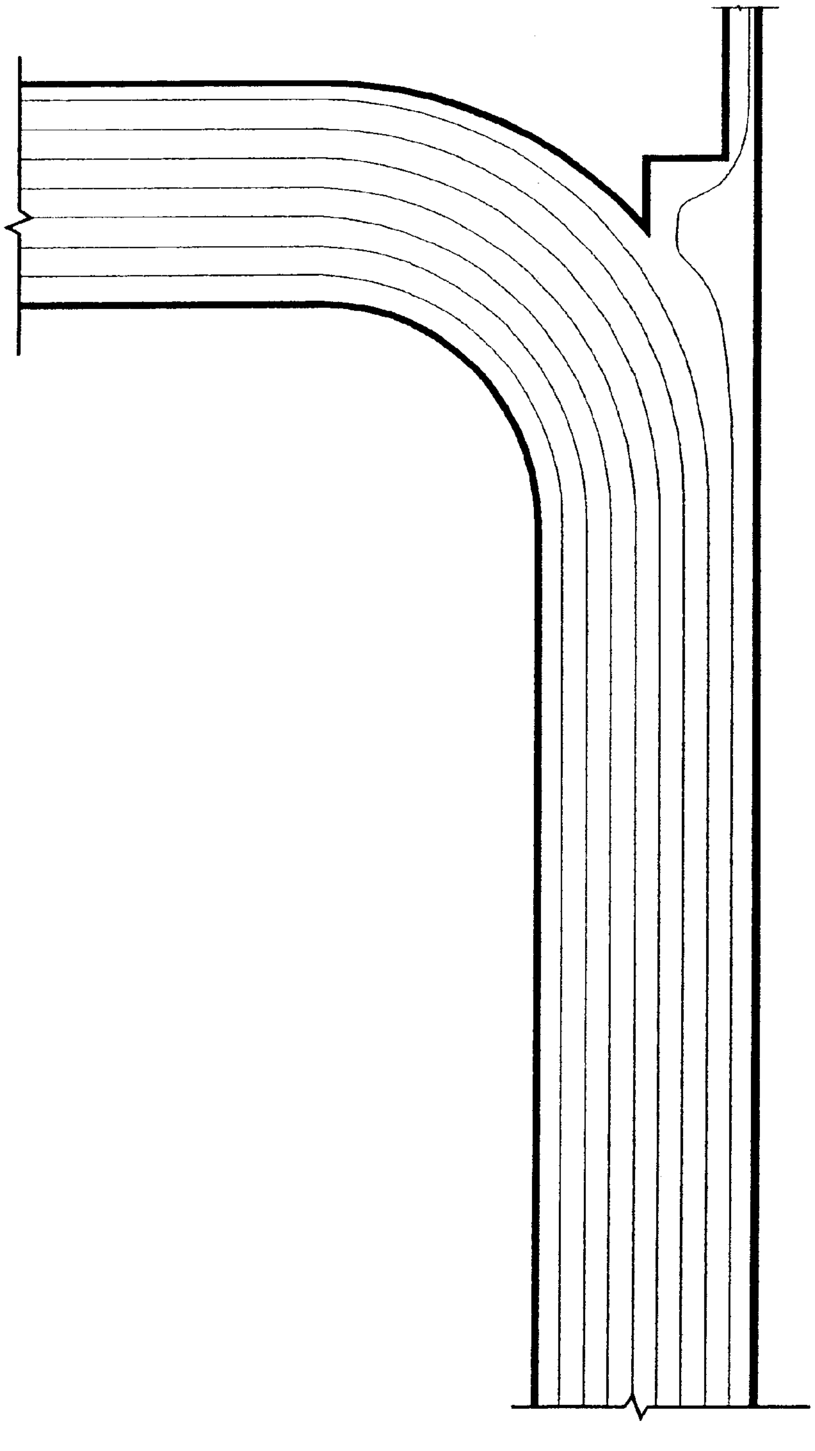
FIG. 5 is an 8-droplet projectory profile in a preferred elbow configuration.
Figure 6:
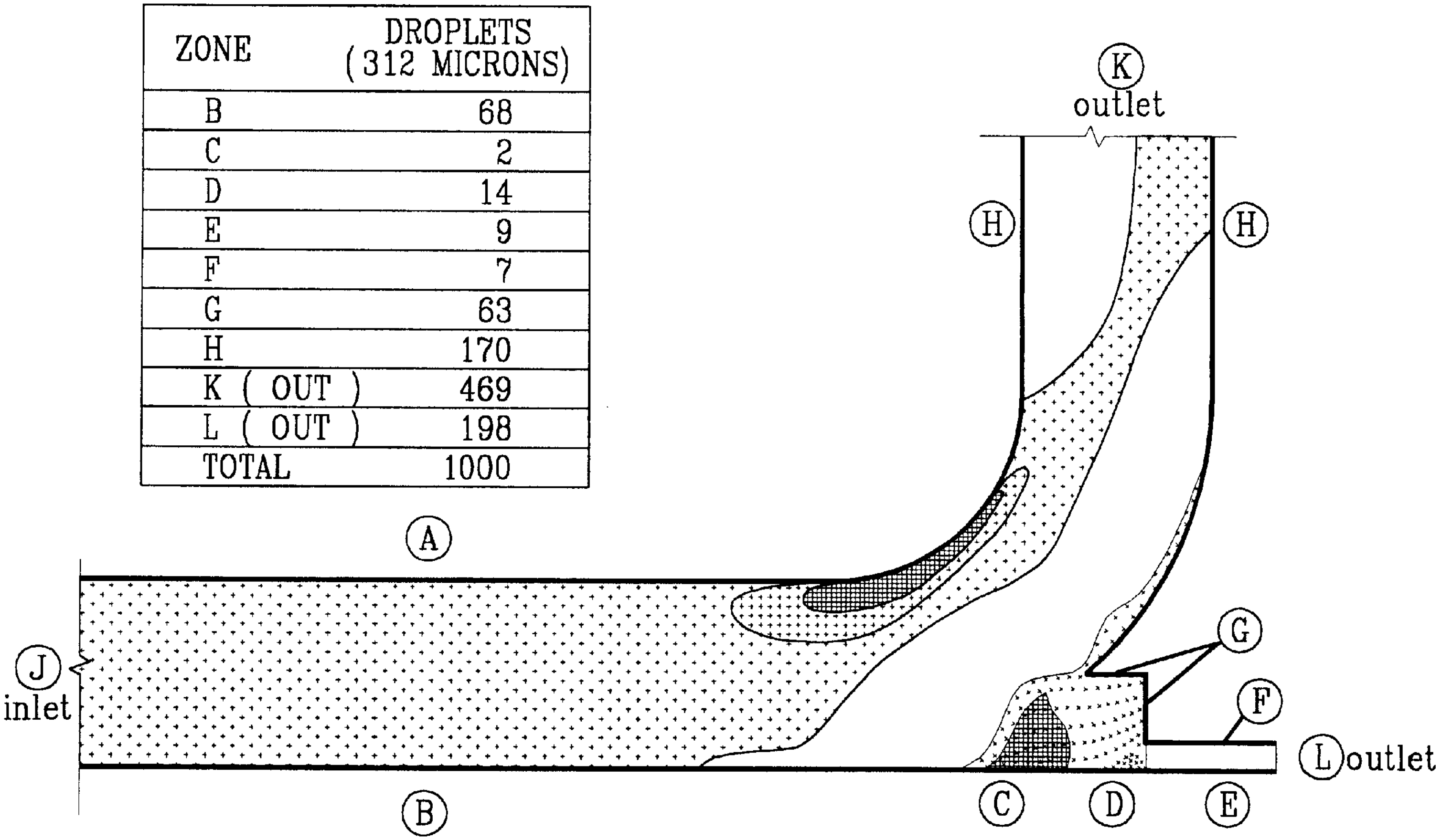
Figure 7:
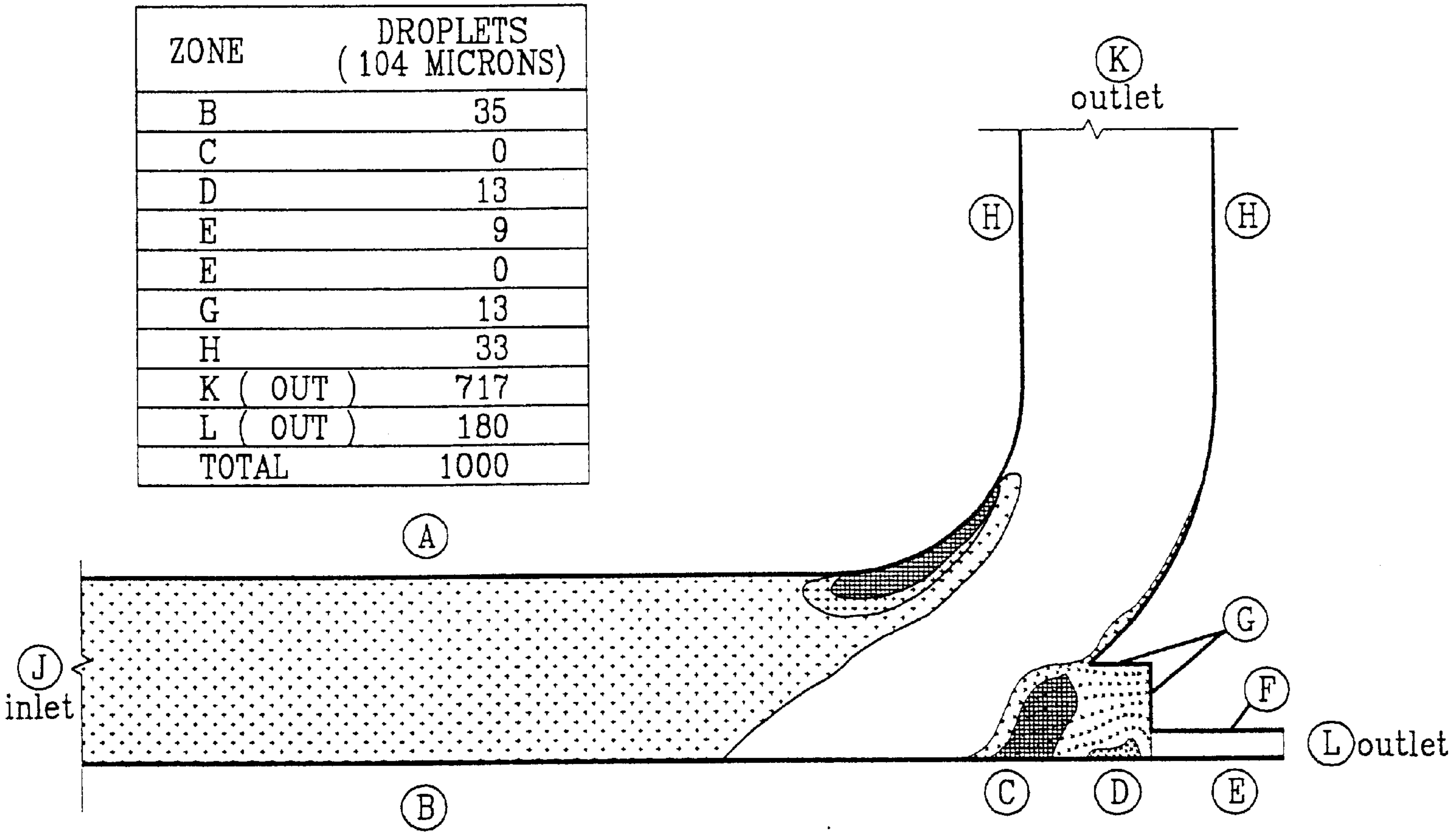
Figure 8:
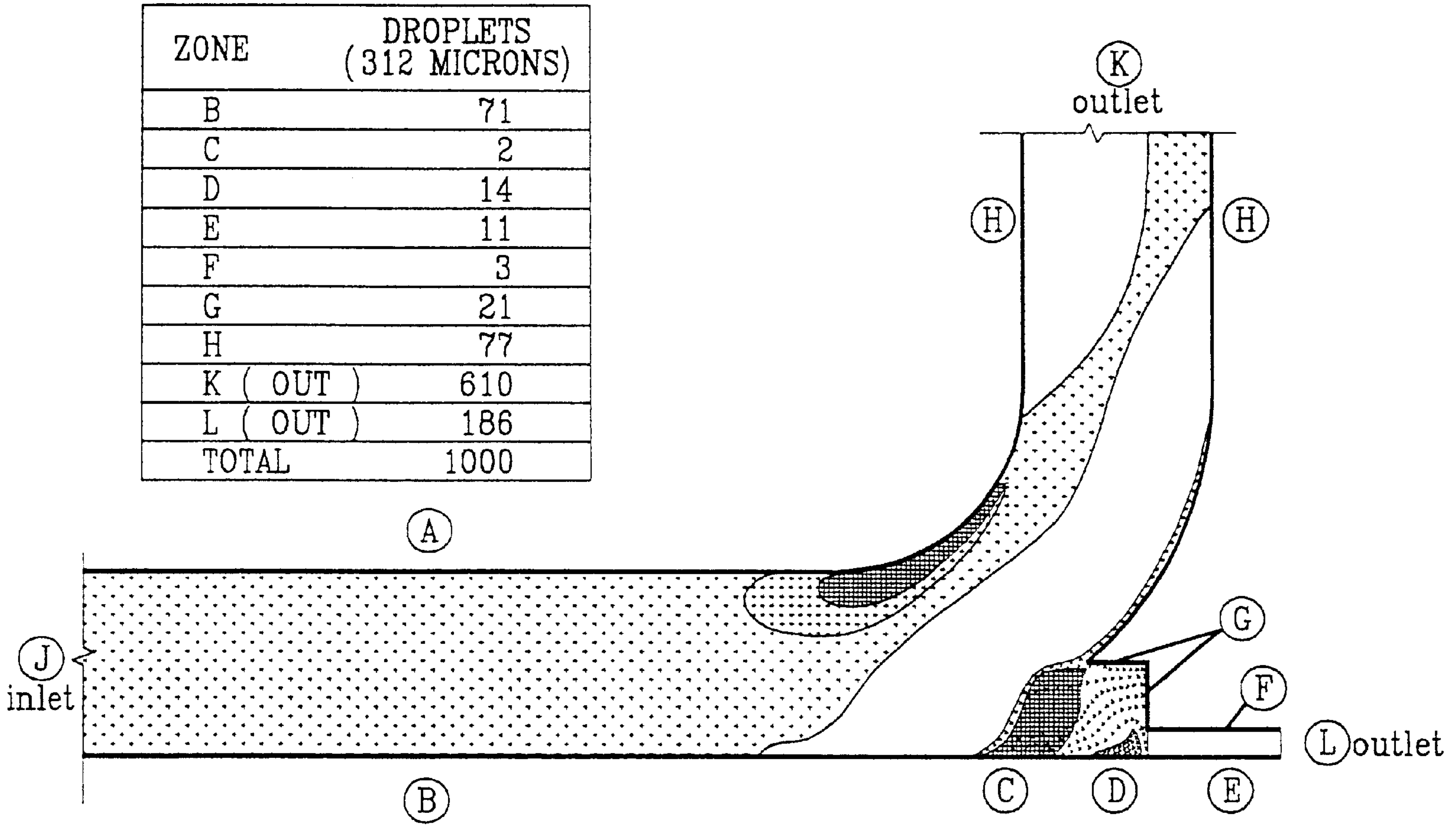

After solving for the vapor velocity, pressure and turbulencc profiles for the continuous phase, inert liquid droplets were injected at the inlet boundary. FIG. 5 illustrates a typical polyethylene drop trajectory for 8 drops of size 0.0041 inch (104 micron) with a velocity of 35 ft/sec.. Droplet size and inertia were found to be strongly correlated with capture efficiency of the elbow device. FIGS. 4 and 6 illustrate polyethylene process recycle velocity profiles with 0.0041 inch and 0.0123 inch elbow inlets respectively, at different velocities. FIGS. 7 and 8 are similar drop trajectory results for a polypropylene process. FIG. 9 illustrates a right angle elbow having a bypass line 50 slightly below the level of inlet line 4, FIG. 10 shows a bypass line 52 slightly above inlet line 4, and FIG. 11 shows a rectangular bypass duct 53 having a center at the same level as the center of inlet 4, as in ASME model B16.9. FIG. 11*a* shows the cross section of bypass duct 53, having dimensions of 9 and 18. Preferably, the bypass duct in any of our configurations will have a hydraulic diameter of 5 to 30%, more preferably 5 to 20%, of the diameter of the primary outlet. All of these configurations are satisfactory in our invention.

Model Fluid Property Assumptions

For analyses, reactor fluid properties similar to those of common commercial homopolymers of ethylene and propylene were assumed. These are shown below in TABLE 2. The FLUENT continuous phase was represented by the Cycle Gas vapor properties.

TABLE 2

CYCLE GAS FLUID PROPERTIES NEAR REACTOR INLET

| | | Polypropylene | |
|---|---|---|---|
| Polymer | Polyethylene | A | B |
| Pressure, psia | 374.4 | 556.2 | 501.2 |
| Temp, deg C | 53.0 | 63.1 | 57.2 |
| Liquid wt % | 7.65 | 15.60 | 24.96 |
| Density, lb/ft$^3$ | | | |
| mixture | 1.95 | 5.51 | 5.25 |
| vapor | 1.80 | 4.80 | 4.14 |
| liquid | 38.6 | 26.4 | 27.30 |
| Viscosity, cp | | | |
| vapor | 0.016 | 0.014 | 0.013 |
| liquid | 0.180 | 0.035 | 0.044 |

Model Boundary Conditions and Computational Model Results

Referring to FIG. 4, at steady state, a uniform velocity isothermal vapor enters the left side of the computational domain. Some fluid exits through the chamber and collection nozzle (zone E and outlet L). Most of the fluid is turned at the elbow and travels vertically. It exits at the top boundary (outlet zone K). A velocity specification and reference pressure was used at the inlet boundary (zone J). Pressure and/or velocity specifications were employed at both of the exit boundaries (zones K and L).

The amount of vapor exiting through the collection nozzle (zone E and outlet L) is a function of the pressure difference between the two exit boundaries (zones K and L). Outlet L is attached to recycle piping (slip stream line 19) to transport the mixture to an upper portion of the fluidized bed 2 (FIG. 1). The control of the flow bypassing the Reactor bottom head 23 and plate 7 may be made by varying the resistance in line 19 and valve 21.

The liquid droplet recovery information is summarized below in Table 3 The liquid droplet recovery was defined by dividing the droplet quantity in zones C, D, E, F, G, and L by the total injected. The vapor recovery is the percent of total vapor flow which exits through the collection device at the elbow. Since the liquid droplet recovery exceeds the vapor recovery, a net enrichment of liquid occurs in the secondary stream exiting the collection nozzle.

TABLE 3

LIQUID DROPLET RECOVERY FOR 1,000 TRAJECTORIES-ELBOW WITH SETTLING CHAMBER AND BYPASS DUCT-FIG. 4

| Polymer | Inlet Liquid (wt. %) | Inlet Velocity (feet/sec) | Bypass Vapor Recovery (% of inlet) | Bypass Droplet (microns) | Bypass Liquid Recovery (% of inlet) |
|---|---|---|---|---|---|
| Polyethylene | 7.65 | 35 | 19.59 | 104 | 24.00 |
| Polyethylene | 7.65 | 35 | 19.59 | 312 | 27.90 |
| Polyethylene | 7.65 | 55 | 19.61 | 104 | 24.40 |
| Polyethylene | 7.65 | 55 | 19.61 | 312 | 28.82 |
| Polypropylene | 15.60 | 25 | 17.38 | 104 | 20.30 |
| Polypropylene | 15.60 | 25 | 17.38 | 312 | 22.30 |
| Polypropylene | 15.60 | 35 | 17.28 | 104 | 20.30 |
| Polypropylene | 15.60 | 35 | 17.28 | 312 | 22.50 |
| Polypropylene | 24.96 | 25 | 18.45 | 104 | 21.50 |
| Polypropylene | 24.96 | 25 | 18.45 | 312 | 23.70 |
| Polypropylene | 24.96 | 35 | 18.44 | 104 | 21.70 |
| Polypropylene | 24.96 | 35 | 18.44 | 312 | 24.20 |

PE liquid droplet population distributions are illustrated in Table 4 for polyethylene and Table 5 for polypropylene. FIG. 5 illustrates typical liquid droplet trajectory profiles for a subset case of only eight liquid droplets.

TABLE 4

LIQUID DROPLET DISTRIBUTION FOR POLYETHYLENE CYCLE GAS

| | | | | |
|---|---|---|---|---|
| Vapor Density $lb/ft^3$ | 1.80 | 1.80 | 1.80 | 1.80 |
| Liquid Density $lb/ft^3$ | 38.60 | 38.60 | 38.60 | 38.60 |
| Condensed Liquid weight percent | 7.65 | 7.65 | 7.65 | 7.65 |
| Cycle Pipe Velocity feet/sec | 35.00 | 35.00 | 55.00 | 55.00 |
| Droplet Mean Size microns | 104.00 | 312.00 | 104.00 | 312.0 |
| Pressure Differential (Outlet - Bypass) ($lb/in^2$) | 1.0 | 1.0 | 2.3 | 2.3 |
| Droplet Distribution by Zone (reference FIG. 4) (% of 1,000 trajectories) | | | | |

TABLE 4-continued

LIQUID DROPLET DISTRIBUTION FOR POLYETHYLENE CYCLE GAS

| | | | | |
|---|---|---|---|---|
| A | 0.00 | 0.00 | 0.00 | 0.00 |
| B | 3.80 | 13.00 | 2.00 | 6.80 |
| C | 0.00 | 1.20 | 0.00 | 0.20 |
| D | 1.10 | 1.10 | 0.60 | 1.40 |
| E | 1.20 | 1.30 | 0.90 | 0.90 |
| F | 0.00 | 0.30 | 0.00 | 0.70 |
| G | 2.00 | 5.30 | 1.90 | 6.30 |
| H | 5.60 | 16.40 | 5.40 | 17.00 |
| J | 0.00 | 0.00 | 0.00 | 0.00 |
| K | 66.60 | 42.70 | 68.20 | 46.90 |
| L | 19.70 | 18.70 | 21.00 | 19.80 |
| Bypass percentage of Inlet | | | | |
| Vapor | 19.59 | 19.59 | 19.61 | 19.61 |
| Liquid | 24.00 | 27.90 | 24.40 | 28.82 |
| Bypass Liquid Enrichment (weight ratio to Inlet) | 1.21 | 1.38 | 1.22 | 1.44 |

TABLE 5

LIQUID DROPLET DISTRIBUTION FOR POLPROPYLENE CYCLE GAS -- ELBOW WITH SETTLING CHAMBER AND BYPASS DUCT FIGS. 7 and 8

| | | | | | | | | |
|---|---|---|---|---|---|---|---|---|
| Vapor Density (lb/ft^3) | 4.80 | 4.80 | 4.80 | 4.80 | 4.14 | 4.14 | 4.14 | 4.14 |
| Liquid Density (lb/ft^3) | 26.40 | 26.40 | 26.40 | 26.40 | 27.30 | 27.30 | 27.30 | 27.30 |
| Inlet Liquid (weight %) | 15.60 | 15.60 | 15.60 | 15.60 | 24.96 | 24.96 | 24.96 | 24.96 |
| Inlet Velocity (feet/second) | 25. | 25. | 35. | 35. | 25. | 25. | 35. | 35. |
| Bypass Liquid Droplet Size (microns) | 104. | 312. | 104. | 312. | 104. | 312. | 104. | 312. |
| Pressure Differential (Outlet - Bypass) (lb/ft^2) | 0.9 | 0.9 | 1.7 | 1.7 | 0.9 | 0.9 | 1.7 | 1.7 |
| Droplet Distribution by Zone (reference FIG. 4) (% of 1,000 trajectories) | | | | | | | | |
| A | 0.00 | 0.00 | 0.00 | 0.00 | 0.00 | 0.00 | 0.00 | 0.00 |
| B | 3.00 | 9.90 | 1.90 | 6.20 | 3.50 | 11.20 | 2.20 | 7.10 |
| C | 0.00 | 1.10 | 0.00 | 0.40 | 0.00 | 1.30 | 0.00 | 0.70 |
| D | 1.10 | 1.20 | 0.60 | 1.60 | 1.30 | 1.30 | 0.80 | 1.40 |
| E | 0.90 | 1.00 | 1.60 | 1.10 | 0.90 | 0.90 | 1.40 | 1.10 |
| F | 0.00 | 0.10 | 0.00 | 0.20 | 0.00 | 0.00 | 0.00 | 0.30 |

TABLE 5-continued

LIQUID DROPLET DISTRIBUTION FOR POLPROPYLENE CYCLE GAS -- ELBOW WITH SETTLING CHAMBER AND BYPASS DUCT FIGS. 7 and 8

| | | | | | | | | |
|---|---|---|---|---|---|---|---|---|
| G | 1.20 | 1.70 | 1.30 | 1.90 | 1.30 | 1.90 | 1.40 | 2.10 |
| H | 2.90 | 6.80 | 2.70 | 6.70 | 3.30 | 7.80 | 3.00 | 7.70 |
| J | 0.00 | 0.00 | 0.00 | 0.00 | 0.00 | 0.00 | 0.00 | 0.00 |
| K | 73.80 | 61.00 | 75.10 | 64.40 | 71.70 | 57.30 | 73.10 | 61.00 |
| L | 17.10 | 17.20 | 16.80 | 17.50 | 18.00 | 18.30 | 18.10 | 18.60 |
| Bypass percentage of Inlet | | | | | | | | |
| Vapor | 17.38 | 17.38 | 17.28 | 17.28 | 18.45 | 18.45 | 18.44 | 18.44 |
| Liquid | | 20.30 | 22.30 | 20.30 | 22.50 | 21.50 | 23.70 | 21.70 |
| 24.20 | | | | | | | | |
| Bypass Liquid Enrichment (weight ratio to Inlet) | 1.14 | 1.23 | 1.15 | 1.24 | 1.12 | 1.20 | 1.13 | 1.22 |

This analysis reveals that it is feasible to collect about 20.30 to 24.20% of the liquid in the recycle stream into the smaller split stream, and to increase the ratio of liquid to gas in the smaller stream as compared to the ratio in the main recycle stream. Liquid collection efficiency is strongly correlated with droplet size and density, and the difference in momentum between the vapor and liquid phases.

Computational Model Conclusions

Two- and three-dimensional models were developed for the recycle fluid piping elbow. Results were presented from the FLUENT Unstructured Mesh software program. Liquid droplet particle tracking was done using the Lagrangian approach. Recycle fluid properties typical of commercial polyethylene and homopolypropylene processes were assumed in the analysis. For the polyethylene case, recycle velocities of 35 and 55 ft/sec were considered, with a liquid condensation level of 7.65 wt %. The polypropylene cases were at 15.6 wt % and 24.9% condensing, each comparing velocities of 25 and 35 ft/sec.

In this analysis the vapor recovery through the collection device was maintained below 21% of the incoming flow rate. This amount of bypass around the Reactor distributor plate may be tolerated without disrupting the fluidization of the polymer bed.

When comparing the PE results at increasing recycle line velocities, about the same liquid droplet collection efficiency was observed. For the polyethylene system, as the mean droplet size was increased from 104 to 312 microns, the liquid droplet recovery increased by about 4%. The polypropylene system has a smaller difference in density between the vapor and liquid phases. Accordingly the momentum difference is smaller between the phases. The improvement in liquid collection efficiency with increasing liquid droplet size is smaller.

The analysis reveals that it is feasible to collect about 20% to about 29% of the liquid into the smaller split stream with a differential pressure—that is, the difference in pressure between the points of entrance into the reactor of the smaller split stream and the larger stream of line 3—of less than 3 psi. Liquid collection efficiency is strongly correlated with droplet size and momentum difference between the vapor and liquid phases.

Splitter Design

As indicated above, the splitter is preferably designed more or less as illustrated in FIGS. 2, 3, 9. 10, or 11 using an elbow having a small line 19 on its large radius side and most preferably a settling chamber 25 defined by a take-off of larger diameter than the small line 19. The constriction to line 19 can be perpendicular to flow as wall 29 in FIG. 3 or somewhat tapered or gradual as in FIG. 2, and line 19 may be rectangular in cross section as seen in FIG. 11*a*. As seen in the velocity and droplet distribution data above, use of a settling chamber will result in an accumulation of liquid available to be discharged with the slip stream, giving it a higher ratio of liquid to gas than the incoming recycle stream or the primary recycle stream. The design illustrated in FIG. 3, wherein the settling chamber has a vertical dead-end wall 29, generates a slip stream in line 19 relatively highly enriched in liquid but relatively low in volume; tapering wall 29 as in FIG. 2 will result in a higher volume of fluid having a lower liquid percentage.

EXAMPLES

In order to provide a better understanding of the present invention the following examples are provided. They represent computer simulations of commercial scale operating facilities for the gas phase fluidized bed exothermic production of polyethylene and polypropylene.

Example 1

A fluidized bed polymerization reactor system similar to that of FIG. 1 is producing linear low density polyethylene which contains about 10 weight percent copolymerized hexene. Referring to FIG. 1, the recycle stream in line 4 contains a mixture of hydrogen, nitrogen, methane, ethane, ethylene, hexene and hexane. The pressure 374.4 psia and temperature 53.0° C. at the exit of the external cooler 17 yields a bulk recycle stream containing 7.65 weight percent liquid. The entrained droplet size of the liquid is in the range of 104 to 312 microns or 0.0041 to 0.0123 inches. The liquid phase is rich in hexene and hexane and has a density of 38.6 lb/ft$^3$. The vapor phase is rich in the more volatile components of the mixture and has a density of 1.80 lb/ft$^3$. As illustrated in FIG. 1 the small bypass or slip stream in line 19 is designed to contain 19.59 percent of the inlet vapor (the gas phase of the inlet fluid) with a 0.9 psi differential pressure. The velocity of the fluid is 35 feet per second at the exit of the cooler 17 and upstream of the separation elbow. The small stream 19 contains an average of 25.95 percent of the liquid entering the inlet. The average enrichment is thus 1.29 times the liquid content of the bulk recycle stream exiting the cooler 17.

Example 2

A fluidized bed polymerization reactor is producing linear low density polyethylene which contains about 10 weight percent polymerized hexene. Referring to FIG. 1, the recycle stream 4 contains a mixture of hydrogen, nitrogen, methane, ethane, ethylene, hexene and hexane. The pressure 374.4 psia and temperature 53.0° C. at the exit of the external cooler 17 yields a recycle stream containing 7.65 weight percent liquid. The liquid phase, rich in hexene and hexane, has a density of 38.6 lb/ft$^3$. The vapor phase is rich in the more volatile components of the mixture and has a density of 1.80 lb/ft$^3$. As illustrated in FIG. 1, the small stream 19 is designed to contain 19.61 percent of the inlet vapor with a 2.3 psi differential pressure. The velocity of the recycle stream is 55 feet per second at the exit of the cooler 17 and upstream of the separation elbow. The small stream 19 contains an average of 26.61 percent of the inlet liquid. The average weight ratio enrichment of the small stream 19 is thus 1.33 times the liquid content of the bulk recycle stream exiting the cooler 17.

Example 3

A fluidized bed polymerization reactor is producing propylene homopolymer. Referring to FIG. 1, the recycle stream 4 contains a mixture of hydrogen, nitrogen, propylene and propane. The pressure is 556.2 psia and temperature of 63.1° C. at the exit of the external cooler 17 yield a recycle stream containing 15.60 weight percent liquid. The liquid phase, rich in propylene and propane, has a density of 26.4 lb/ft$^3$. The vapor phase is rich in the more volatile components of the mixture and has a density of 4.80 lb/ft$^3$. As illustrated in FIG. 1 the small stream 19 is designed to contain 17.38 percent of the inlet vapor with a 0.9psi differential pressure. The fluid velocity is 25 feet per second at the exit of the cooler 17 and upstream of the separation elbow. The small stream 19 contains an average of 21.3 percent of the inlet liquid. The average weight ratio enrichment is thus 1.18 times the liquid content of the bulk recycle stream exiting the cooler 17.

Example 4

A fluidized bed polymerization reactor is producing propylene homopolymer. Referring to FIG. 1, the recycle stream 4 contains a mixture of hydrogen, nitrogen, propylene and propane. The pressure (556.2 psia) and temperature (63.1° C.) at the exit of the external cooler 17 yield a recycle stream containing 15.60 weight percent liquid. The liquid phase, being rich in propylene and propane, has a density of 26.4 lb/ft$^3$. The vapor phase is rich in the more volatile components of the mixture and has a density of 4.80 lb/ft$^3$. As illustrated in FIG. 1 the small stream 19 is designed to contain 17.28 percent of the inlet vapor with a 1.7 psi differential pressure. The fluid velocity is 35 feet per second at the exit of the cooler 17 and upstream of the separation elbow. The small stream 19 contains an average of 21.4 percent of the inlet liquid. The average weight ratio enrichment is thus 1.19 times the liquid content of the bulk recycle stream exiting the cooler 17.

Example 5

A fluidized bed polymerization reactor is producing propylene homopolymer. Referring to FIG. 1, the recycle stream 4 contains a mixture of hydrogen, nitrogen, propylene and propane. The pressure 501.2 psia and temperature 57.2° C. at the exit of the external cooler 17 yields a recycle stream containing 24.96 weight percent liquid. The liquid phase being rich in propylene and propane has a density of 27.3 lb/ft$^3$. The vapor phase, being rich in the more volatile components of the mixture, has a density of 4.14 lb/ft$^3$. As illustrated in FIG. 1 the small branch stream 19 is designed to contain 18.45 percent of the inlet vapor with a 0.9 psi differential pressure. The fluid velocity is 25 feet per second at the exit of the cooler 17 and upstream of the separation elbow. The small stream 19 contains an average of 22.60% of the inlet liquid. The average weight ratio enrichment is thus 1.16 times the liquid content of the bulk recycle stream exiting the cooler 17.

Example 6

A fluidized bed polymerization reactor is producing propylene homopolymer. Referring to FIG. 1, the recycle stream 4 contains a mixture of hydrogen, nitrogen, propylene and propane. The pressure of 501.2 psia and temperature 57.2° C. at the exit of the external cooler 17 yields a recycle stream containing 24.96 weight percent liquid. The liquid phase, being rich in propylene and propane, has a density of 27.3 lb/ft$^3$. The vapor phase being rich in the more volatile components of the mixture, has a density of 4.14 lb/ft$^3$. As illustrated in FIG. 1 the small branch stream 19 is designed to contain 18.44 percent of the inlet vapor with a 1.7 psi differential pressure. The fluid velocity is 35 feet per second at the exit of the cooler 17 and upstream of the separation elbow. The small stream 19 contains an average of 22.95 percent of the inlet liquid. The enrichment is thus 1.17 times the liquid content of the bulk recycle stream exiting the cooler 17.

Example 7

A 3 dimensional cylindrical recycle pipe with a 40.25 inch internal diameter was analyzed with an abrupt 90 degree elbow. A 12 inch internal diameter slip stream cylindrical pipe was located across from the bottom of the inlet pipe as referred in FIG. 9. At the inlet to the domain 1,000 liquid droplets were injected throughout the cross section. The fraction of droplets exiting through the secondary bypass slip stream was compared with the fraction exiting the primary outlet. The fraction of vapor exiting the bypass and primary outlet were also compared. The weight fraction of liquid exiting the bypass was computed by material balance and compared with the weight fraction of liquid at the inlet. Operating conditions were identical to those shown in Example 1. The secondary bypass slip stream was designed to contain 16.17 percent of the inlet vapor. This design required a 1.0 psi. pressure difference between the primary outlet and the secondary bypass slip stream. This outlet differential pressure was at an inlet fluid velocity of 35 feet per second. The secondary bypass slip stream was computed to contain an average of 25.81 percent of the total inlet liquid. The average weight ratio enrichment was 1.51 times the weight fraction of liquid at the inlet.

Example 8

A 3-dimensional cylindrical recycle pipe with a 40.25 inch internal diameter was analyzed with an abrupt 90 degree elbow. A 12 inch internal diameter slip stream cylindrical pipe was located across from the top of the inlet pipe as referred in FIG. 10. At the inlet to the domain 1,000 liquid droplets were injected throughout the cross section. The fraction of droplets exiting through the secondary bypass slip stream was compared with the fraction exiting the primary outlet. The fraction of vapor exiting the bypass and primary outlet were also compared. The weight fraction of liquid exiting the bypass was computed by material balance and compared with the weight fraction of liquid at the inlet. Operating conditions were identical to those shown in Example 1. The secondary bypass slip stream was designed to contain 15.25 percent of the inlet vapor. This design required a 1.0 psi pressure difference between the primary outlet and the secondary bypass slip stream. This outlet differential pressure was at an inlet fluid velocity of 35 feet per second. The secondary bypass slip stream was computed to contain an average of 29.07 percent of the total inlet liquid. The average weight ratio enrichment was 1.77 times the weight fraction of liquid at the inlet.

Example 9

A 3-dimensional cylindrical recycle pipe with a 40.25 inch internal diameter was analyzed with an ASME B16.9 specified elbow. An 18 inch wide by 9 inch high rectangular slip stream duct was located across from the center streamline of the inlet pipe as referred in FIG. 11. At the inlet to the domain 1,000 liquid droplets were injected throughout the cross section. The fraction of droplets exiting through the secondary bypass slip stream was compared with the fraction exiting the primary outlet. The fraction of vapor exiting the bypass and primary outlet were also compared. The weight fraction of liquid exiting the bypass was computed by material balance and compared with the weight fraction of liquid at the inlet. Operating conditions were identical to those shown in Example 1. The secondary bypass slip stream was designed to contain 20.70 percent of the inlet vapor. This design required a 0.7 psi pressure difference between the primary outlet and the secondary bypass slip stream. This outlet differential pressure was at an inlet fluid velocity of 35 feet per second. The secondary bypass slip stream was computed to contain an average of 36.88 percent of the total inlet liquid. The average weight ratio enrichment was 1.69 times the weight fraction of liquid at the inlet.

Example 10

A 3-dimensional cylindrical recycle pipe with a 40.25 inch internal diameter was analyzed with an ASME B16.9 specified elbow. An 18 inch wide by 9 inch high rectangular slip stream duct was located across from the center streamline of the inlet pipe as referred in FIG. 11. At the inlet to the domain 1,000 liquid droplets were injected throughout the cross section. The fraction of droplets exiting through the secondary bypass slip stream was compared with the fraction exiting the primary outlet. The fraction of vapor exiting the bypass and primary outlet were also compared. The weight fraction of liquid exiting the bypass was computed by material balance and compared with the weight fraction of liquid at the inlet. Operating conditions were identical to those shown in Example 2. The secondary bypass slip stream was designed to contain 20.79 percent of the inlet vapor. This design required a 1.8 psi pressure difference between the primary outlet and the secondary bypass slip stream. This outlet differential pressure was at an inlet fluid velocity of 55 feet per second. The secondary bypass slip stream was computed to contain an average of 38.59 percent of the total inlet liquid. The average weight ratio enrichment was 1.73 times the weight fraction of liquid at the inlet.

Example 11

A 3-dimensional cylindrical recycle pipe with a 40.25 inch internal diameter was analyzed with an ASME B16.9 specified elbow. A 18 inch wide by 9 inch high rectangular slip stream duct was located across from the center streamline of the inlet pipe as referred in FIG. 11. At the inlet to the domain 1,000 liquid droplets were injected throughout the cross section. The fraction of droplets exiting through the secondary bypass slip stream was compared with the fraction exiting the primary outlet. The fraction of vapor exiting the bypass and primary outlet were also compared. The weight fraction of liquid exiting the bypass was computed by material balance and compared with the weight fraction of liquid at the inlet. Operating conditions were identical to those shown in Example 3. The secondary bypass slip stream was designed to contain 18.12 percent of the inlet vapor. This design required a 0.6 psi pressure difference between the primary outlet and the secondary bypass slip stream. This outlet differential pressure was at an inlet fluid velocity of 25 feet per second. The secondary bypass slip stream was computed to contain an average of 35.38 percent of the total inlet liquid. The average weight ratio enrichment was 1.67 times the weight fraction of liquid at the inlet.

Example 12

A 3-dimensional cylindrical recycle pipe with a 40.25 inch internal diameter was analyzed with an ASME B16.9 specified elbow. An 18 inch wide by 9 inch high rectangular slip stream duct was located across from the center streamline of the inlet pipe as referred in FIG. 11. At the inlet to the domain 1,000 liquid droplets were injected throughout the cross section. The fraction of droplets exiting through the secondary bypass slip stream was compared with the fraction exiting the primary outlet. The fraction of vapor exiting the bypass and primary outlet were also compared. The weight fraction of liquid exiting the bypass was computed by material balance and compared with the weight fraction of liquid at the inlet. Operating conditions were identical to those shown in Example 4. The secondary bypass slip stream was designed to contain 18.15 percent of the inlet vapor. This design required a 1.3 psi pressure difference between the primary outlet and the secondary bypass slip stream. This outlet differential pressure was at an inlet fluid velocity of 35 feet per second. The secondary bypass slip stream was computed to contain an average of 30.10 percent of the total inlet liquid. The average weight ratio enrichment was 1.49 times the weight fraction of liquid at the inlet.

Example 13

A 3-dimensional cylindrical recycle pipe with a 40.25 inch internal diameter was analyzed with an ASME B16.9 specified elbow. An 18 inch wide by 9 inch high rectangular slip stream duct was located across from the center streamline of the inlet pipe as referred in FIG. 11. At the inlet to the domain 1,000 liquid droplets were injected throughout the cross section. The fraction of droplets exiting through the secondary bypass slip stream was compared with the fraction exiting the primary outlet. The fraction of vapor exiting the bypass and primary outlet were also compared. The weight fraction of liquid exiting the bypass was computed by material balance and compared with the weight fraction of liquid at the inlet. Operating conditions were identical to those shown in Example 5. The secondary bypass slip stream was designed to contain 19.71 percent of the inlet vapor. This design required a 0.7 psi pressure difference between the primary outlet and the secondary bypass slip stream. This outlet differential pressure was at an inlet fluid velocity of 25 feet per second. The secondary bypass slip stream was computed to contain an average of 40.09 percent of the total inlet liquid. The average weight ratio enrichment was 1.59 times the weight fraction of liquid at the inlet.

Example 14

A 3-dimensional cylindrical recycle pipe with a 40.25 inch internal diameter was analyzed with an ASME B16.9 specified elbow. An 18 inch wide by 9 inch high rectangular slip stream duct was located across from the center streamline of the inlet pipe as referred in FIG. 11. At the inlet to the domain 1,000 liquid droplets were injected throughout the cross section. The fraction of droplets exiting through the secondary bypass slip stream was compared with the fraction exiting the primary outlet. The fraction of vapor exiting the bypass and primary outlet were also compared. The weight fraction of liquid exiting the bypass was computed by material balance and compared with the weight fraction of liquid at the inlet. Operating conditions were identical to those shown in Example 1. Variations in droplet size were considered to discern the limiting droplet size, below which there was no enrichment of liquid into the secondary bypass slip stream. The secondary bypass slip stream was designed to contain 20.70 percent of the inlet vapor. This design required a 0.7 psi pressure difference between the primary outlet and the secondary bypass slip stream. This outlet differential pressure was at an inlet fluid velocity of 35 feet per second. For a liquid droplet size larger than 20 microns, the secondary bypass slip stream was computed to contain more liquid than the inlet recycle pipe. Thus liquid enrichment into the secondary bypass stream was obtained when the inlet droplet size exceeded 20 microns.

Example 15

A 3-dimensional cylindrical recycle pipe with a 40.25 inch internal diameter was analyzed with an ASME B16.9 specified elbow. An 18 inch wide by 9 inch high rectangular slip stream duct was located across from the center streamline of the inlet pipe as referred in FIG. 11. At the inlet to the domain 1,000 liquid droplets were injected throughout the cross section. The fraction of droplets exiting through the secondary bypass slip stream was compared with the fraction exiting the primary outlet. The fraction of vapor exiting the bypass and primary outlet were also compared. The weight fraction of liquid exiting the bypass was computed by material balance and compared with the weight fraction of liquid at the inlet. Operating conditions were identical to those shown in Example 3. Variations in droplet size were considered to discern the limiting droplet size, below which there was no enrichment of liquid into the secondary bypass slip stream. The secondary bypass slip stream was designed to contain 18.12 percent of the inlet vapor. This design required a 0.6 psi pressure difference between the primary outlet and the secondary bypass slip stream. This outlet differential pressure was at an inlet fluid velocity of 25 feet per second. For a liquid droplet size larger than 47 microns, the secondary bypass slip stream was computed to contain more liquid than the inlet recycle pipe. Thus liquid enrichment into the secondary bypass stream was obtained when the inlet droplet size exceeded 47 microns.

Example 16

A fluidized bed polymerization reactor similar to that of FIG. 1 is producing propylene homopolymer. Referring to FIG. 1, the recycle stream 4 contains a mixture of hydrogen, nitrogen, propylene and propane. The pressure is 501.2 psia and the temperature is 57.2° C. at the exit of cooler 17, yielding a recycle stream containing 24.96 weight percent liquid at the cooler exit. The liquid phase is rich in propylene and propane and has a density of 27.3 lb/ft$^3$. The vapor phase is rich in the more volatile species and has a density of 4.14 lb/fl$^3$. As illustrated in FIG. 1, the small line 19 is designed to contain 19.71 percent of the inlet vapor with a 0.7psi differential pressure between the primary outlet and the secondary bypass. The recycle stream velocity is 25 feet per second at the exit of the cooler 17 and upstream of the splitter 22. When the valve 21 is closed in bypass stream 19, some amount of liquid is removed from fluidized bed 2 as the polymer product is withdrawn through line 8 into vessel 10. The liquid vaporizes in vessel 10, which increases the pressure in vessel 10. This back pressure inhibits the flow of polymer product through line 8. The polymer production capacity of the facility is thus limited by the ability to remove polymer product through line 8. Opening the valve 21 in the bypass line 19 causes the amount of liquid entering the fluidized bed 2 through line 3 to be reduced. The secondary bypass slip stream (line 19) was computed to contain an average of 40.09 percent of the total inlet liquid. Bypass line 19 achieves an enrichment of liquid content of 1.59 times the liquid content of the stream exiting the cooler 17, and the production and removal of polymer product is increased by 18%.

We claim:

1. Method of controlling the temperature in a fluidized bed wherein an exothermic reaction is conducted to make particulate product in a reactor containing said fluidized bed maintained by the distribution of fluid at a fluid distribution level and wherein said particulate product is withdrawn at a product withdrawal level within said fluidized bed, comprising continuously or intermittently removing from said reactor a stream of fluid, removing heat from said stream of fluid and condensing at least a portion thereof, passing said stream of fluid through a conduit segment having a first exit duct and a second exit duct to separate liquid and gas in said second exit duct from liquid and gas in said first exit duct, recycling the liquid and gas in said first exit duct to said fluid distribution level and recycling the liquid and gas in said second exit duct by a direct passage to a zone within said fluidized bed above said fluid distribution level.

2. Method of claim 1 wherein said exothermic reaction is to make a polyolefin.

3. Method of claim 1 wherein said conduit segment is an elbow, and said second exit duct is located on the outside radius of said elbow and has a smaller diameter than said first exit duct.

4. Method of claim 3 wherein said liquid and gas in said second exit duct comprise 5–30% by weight of said stream of fluid.

5. Method of claim 1 wherein the pressure differential between said fluid distribution level and said zone above said fluid distribution level is about 0.01 to about 3 psi.

6. Method of claim 1 wherein said liquid and gas in said second exit duct has a higher ratio of liquid to gas than the ratio of liquid to gas in said first exit duct.

7. Method of claim 1 wherein said liquid and gas in said second exit duct is recycled to at least one zone within said fluidized bed above said product withdrawal level.

8. Method of claim 1 wherein said second exit duct receives a concentration of liquid from 1.01 to 3.0 times that of said stream of fluid removed from said fluidized bed after condensing.

9. Method of claim 6 wherein the ratio of liquid to gas in said second exit duct is from 1.1 to 2.5 times higher than said ratio in said fluid removed from said fluidized bed after condensing.

10. Method of claim 1 wherein said conduit segment includes at least one additional exit duct.

11. Method of recycling fluid in a fluidized bed in a polyolefin reactor, said fluidized bed being situated above distributing means for injecting fluid into said fluidized bed, comprising continuously or intermittently withdrawing fluid from said fluidized bed, cooling said fluid so withdrawn, dividing said fluid by a splitter into a primary stream and a slip stream, said slip stream having a higher ratio of liquid to gas than said primary stream, injecting said primary stream into said fluidized bed at a primary injection level, and injecting said slip stream from said splitter into said fluidized bed at a secondary injection level above said primary injection level.

12. Method of claim 11 wherein said splitter is an elbow.

13. Method of claim 11 wherein said primary injection level is at the level of said distributing means and said slip stream is injected through a direct passage into said fluidized bed at least 12 inches above said distributing means.

14. Method of claim 11 wherein said slip stream is enriched in liquid by at least 10% over said withdrawn fluid.

15. Method of increasing the production capability of a fluidized bed olefin polymerization reactor which (a) removes and recycles fluid for removal of the heat of reaction, said fluid being returned to a level in said reactor below said fluidized bed, and (b) removes product at a product withdrawal level through a conduit at least partially by differential pressure to a product discharge tank, wherein the vaporization of liquid carried with said product into said product discharge tank tends to reduce said differential pressure, comprising passing said recycle fluid through a fluid stream splitter to divide said recycle fluid into a primary stream for return to a level in said reactor below said fluidized bed, and a smaller, secondary stream, said secondary stream having a liquid content, in percent, about 1.01 to about 3.0 times the liquid content, in percent, of said recycle fluid, and injecting said secondary stream by a direct passage into said reactor above said product withdrawal level, whereby the amount of liquid carried out of said reactor with said product is reduced and reduction in said differential pressure is inhibited.

* * * * *